United States Patent Office 3,567,744
Patented Mar. 2, 1971

3,567,744
PROCESS FOR PRODUCING FUROIC ACID DERIVATIVES
Shizuya Tanaka, Minoo-shi, Japan, Hirosuke Yoshioka, Austin, Tex., and Akio Higo, Kobe, and Osamu Magara, Osaka, Japan, assignors to Sumitomo Chemical Company, Ltd., Osaka, Japan
No Drawing. Filed July 15, 1968, Ser. No. 744,693
Claims priority, application Japan, Aug. 14, 1967, 42/52,143, 42/52,144; Aug. 17, 1967, 42/53,029, 42/53,030
Int. Cl. C07d 5/18, 5/20
U.S. Cl. 260—347.3                  10 Claims

ABSTRACT OF THE DISCLOSURE

A novel process for producing 5-substituted 3-furoic acid derivatives useful as intermediates in a synthesis of insecticides. For example 5-benzyl-3-furoic acid is produced by reacting ethylene ketal of ethyl levulinate with ethyl formate in the presence of sodium hydride to yield ethylene ketal of ethyl α-formyl-levulinate, ring-closing the resultant ethylene ketal of ethyl α-formyl-levulinate by contacting it with hydrochloric acid to yield ethyl 5-methyl-3-furoate, brominating the resultant ethyl 5-methyl-3-furoate to yield ethyl 2-bromo-5-bromomethyl-3-furoate, reacting the resultant ethyl 2 - bromo-5-bromo-methyl-3-furoate with benzene in the presence of aluminum chloride to yield ethyl 2-bromo-5-benzyl-3-furoate and, after hydrolyzing the ester to an acid, reacting the resultant 2-bromo - 5 - benzyl - 3-furoic acid with zinc powder in an aqueous ammonia solution to yield 5-benzyl-3-furoic acid.

BACKGROUND OF THE INVENTION

Field of the invention

The present invention relates to a process for producing furoic acid derivatives. More particularly it pertains to a process for producing 5-substituted 3-furoic acid derivatives having the following formula

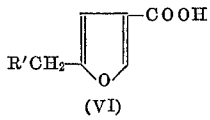

(VI)

wherein R' is an aromatic hydrocarbon residue or a heterocyclic residue, and being useful as intermediates in a synthesis of insecticidal compounds.

Description of the prior art

It is known that esters composed of chrysanthemic acid and 5-substituted 3-furylmethyl alcohol derivatives are excellent in insecticidal activity and that said 5-substituted 3-furylmethyl alcohol derivatives are produced by reducing the corresponding 5-substituted 3-furoic acid derivatives.

Elliott et al., Nature, 213, 493 (1967), discloses a process for preparing ethyl 5-benzyl-3-furoate from phenylacetonitrile and diethyl succinate through various reactions. This process is shown by the formulae,

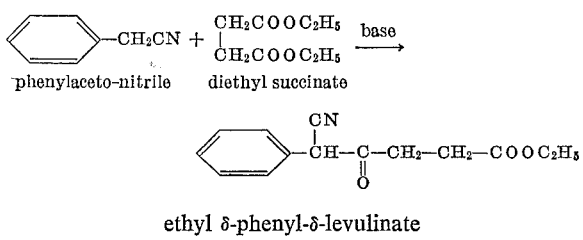
phenylaceto-nitrile    diethyl succinate ethyl δ-phenyl-δ-levulinate

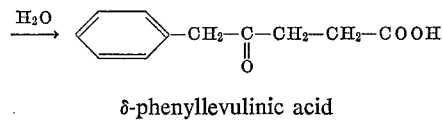

δ-phenyllevulinic acid

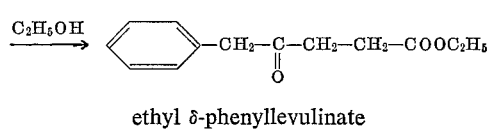

ethyl δ-phenyllevulinate

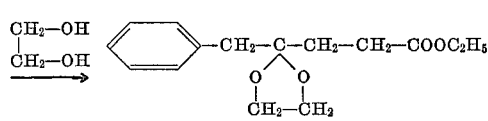

ethylene ketal of ethyl δ-phenyllevulinate

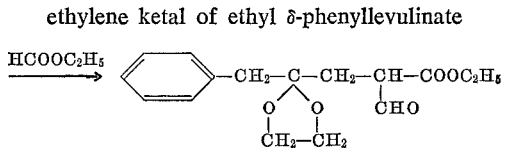

ethylene ketal of ethyl α-formyl-δ-phenyllevulinate

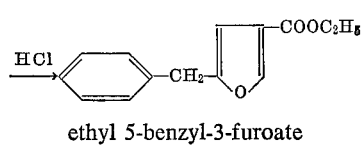

ethyl 5-benzyl-3-furoate

However, this process is disadvantageous in the following standpoints.

In this process, high-vacuum distillation at such low pressure as 0.5 mm. Hg or less is necessary for purification in the formation of ethyl δ-phenyllevulinate and ethylene ketal of ethyl δ-phenyllevulinate and further in order to employ ethyl 5-benzyl-3-furoate as an intermediate of above-mentioned ester of chrysanthemic acid, ethyl 5-benzyl-3-furoate must be also subjected to such high-vacuum distillation for purification thereof. Therefore this process is complicated and disadvantageous industrially.

On the other hand, hitherto, processes for producing 5-methyl-3-furoic acid have been disclosed in J.A.C.S., 77, 4069 (1955), or Angewandte Chemie 71, 709 (1959), and Ber., 94, 825 (1961).

J.A.C.S., 77, 4069 (1955) discloses a process for producing 5-methyl-3-furoic acid derivative from diethyl ketal of ethyl levulinate or enol ether of ethyl levulinate. This process is, for example, shown by the following formulae:

$$CH_3-C-CH_2-CH_2-COOC_2H_5$$
$$\phantom{CH_3-C}OC_2H_5 \phantom{x} OC_2H_5$$

or diethyl ketal of ethyl levulinate $$CH_3-C=CH-CH_2-COOC_2H_5$$
$$\phantom{CH_3-C=CH-}OC_2H_5$$

enol ether of ethyl levulinate

↓ H·COOC$_2$H$_5$ $$CH_3-CO-CH_2-CH-COO_2H_5$$
$$\phantom{CH_3-CO-CH_2-}CHO$$

formyl derivative of ethyl levulinate

↓ ring formation $$CH_3-\underset{O}{\text{furan}}-COOC_2H_5 \xrightarrow{+ H_2O} CH_3-\underset{O}{\text{furan}}-COOH$$

ethyl 5-methyl-3-furoate    5 methyl-3-furoic acid

However, in this process, yields of the formylation and the ring formation are both low. For example, yield of the formylation is 35% and that of the ring formation is 38%.

Angewandte Chemie 71, 709 (1959) and Ber., 94, 825 (1961), disclose a process for producing 5-methyl-3-furoic acid, which comprises the following reaction formulae, $$CH_3-\underset{O}{\text{furan}}=O \xrightarrow{\{Na, HCOOR\}} CH_3-\underset{O}{\text{furan}}\underset{=O}{\overset{CHO}{}}$$

$$\xrightarrow[\text{(2) phosphoric acid}]{\text{(1) CH}_3\text{OH/H}^+} CH_3-\underset{O}{\text{furan}}-COOCH_3$$

$$\xrightarrow[\text{(2) KOH}]{\text{(1) N-bromosuccinimide}} CH_3-\underset{O}{\text{furan}}-COOH$$

However, this process is not preferable because yield of every step is low and further there are many difficulties to obtain raw materials and to conduct the reactions.

SUMMARY OF THE INVENTION

The present inventors studied in order to obtain an advantageous process for producing 5 - substituted 3-furoic acid of the Formula VI. As a result, the present inventors have found a process wherein said 5-substituted 3-furoic acid derivatives can be obtained very advantageously. For example 5-benzyl-3-furoic acid, which is one of the 5-substituted 3-furoic acid derivative of the Formula VI, can be produced by reacting ethyl 5-methyl-3-furoate with bromine to yield ethyl 2-bromo-5-bromomethyl-3-furoate, reacting the resultant ethyl 2-bromo-5-bromomethyl-3-furoate with benzene in the presence of aluminum chloride to yield ethyl 2-bromo-5-benzyl-3-furoate, and finally hydrolyzing and debrominating the resultant ethyl 2-bromo-5-benzyl-3-furoate in the presence of a base and zinc-powders to yield the objective 5-benzyl-3-furoic acid. Further ethyl 5-methyl-3-furoate used as the starting material in the above process can be produced by reacting ethylene ketal of ethyl levulinate with ethyl formate in the presence of sodium hydride to yield ethylene ketal of ethyl α-formyl levulinate and subjecting said ethylene ketal of ethyl α-formyl levulinate to ring formation by contacting it with hydrochloric acid to yield ethyl 5-methyl-3-furoate. In these processes, yields of intermediates and the objective 5-benzyl-3-furoic acid are very high, and there is no troublesome procedure such as high vacuum distillation of intermediates.

A main object of the present invention is to embody a process for producing furoic acid derivatives useful as an intermediate in a synthesis of insecticidal chrysanthemic acid esters.

Another object of the present invention is to embody novel compounds used in the course of the above process.

These and other objects will be apparent to those skilled in the art to which the present invention pertains from the subsequent description.

In order to accomplish said objects, the present invention provides a process for producing 5-substituted 3-furoic acid derivatives of the formula $$R'CH_2-\underset{O}{\text{furan}}-COOH$$

(VI)

wherein R' is an aromatic hydrocarbon residue or a heterocyclic residue, which comprises reacting 2-halo-5-halomethyl-3-furoic acid derivative of the formula $$XCH_2-\underset{O}{\text{furan}}\underset{-X}{\overset{-COOR}{}}$$

(IV)

wherein R is a lower alkyl and X is a halogen atom, with an aromatic hydrocarbon or a heterocyclic compound of the formula R'H, where R' and X have the same meanings as defined above, in the presence of a Friedel-Crafts type catalyst to form a 5-substituted 2-halo-3-furoic acid derivative of the formula $$R'CH_2-\underset{O}{\text{furan}}\underset{-X}{\overset{-COOR}{}}$$

(V)

wherein R, R' and X have the same meanings as defined above, and hydrolyzing and dehalogenating said 5-substituted 2-halo-3-furoic acid derivative of the Formula V to yield the objective furoic acid derivative of the Formula VI.

In the process of the present invention, 2-halo-5-halomethyl-3-furoic acid derivatives of the Formula IV are produced by reacting a 5-methyl-3-furoic acid derivative of the formula $$CH_3-\underset{O}{\text{furan}}-COOR$$

(III)

wherein R has the same meaning as defined above, with a halogen to yield said 2-halo-5-halomethyl-3-furoic acid derivative of the Formula IV.

5-Methyl-3-furoic acid derivatives of the Formula III are known compounds as mentioned above, but in the present invention they are produced by the following manner, that is, by reacting ethylene ketal of levulinic acid ester of the formula $$CH_3-C-CH_2-CH_2-COOR$$
$$\phantom{CH_3-}O\phantom{xx}O$$
$$\phantom{CH_3-C}CH_2-CH_2$$

(I)

wherein R has the same meaning as defined above, with an alkyl formate in the presence of a base to yield a formylated compound of the Formula II.

$$CH_3-C-CH_2-C-COOR$$
$$\phantom{CH_3-}O\phantom{xx}O \phantom{xx} CHO$$
$$\phantom{CH_3-C}CH_2-CH_2$$

(II)

wherein R has the same meaning as defined above, and ring-closing said formylated compound of the Formula II to yield the 5-methyl-3-fluroic acid derivative of the Formula III.

The process of the present invention is shown by the following scheme:

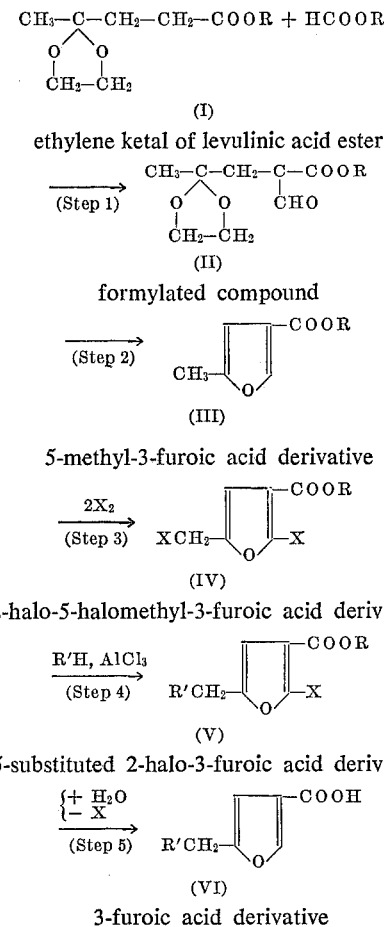

wherein R, R' and X have the same meanings as defined above and R" is an alkyl.

In the present invention, the ethylene ketal of ethyl levurinate (I), the formylated compound of the Formula II, the 2-halo-5-halomethyl-3-furoic acid derivatives of the Formula IV and the 5-substituted 2-halo-3-furoic acid derivatives of the Formula V are novel compounds.

Examples of a lower alkyl of R are methyl, ethyl, isopropyl, n-butyl and iso-butyl group.

Examples of an aromatic hydrocarbon residue or a heterocyclic residue of R' are phenyl, tolyl, xylyl, naphthyl, furyl and thienyl groups.

Examples of an alkyl of R" are methyl, ethyl, isopropyl and n-butyl.

Examples of a halogen of X are chlorine and bromine atoms.

The process of the present invention is illustrated in detail in order of the reaction steps as follows:

STEP 1

Preparation of a formylated compound of the Formula II

An ethylene ketal of levulinic acid ester of the Formula I is reacted with an alkyl formate in the presence of a base in an organic solvent, whereby Claisen condensation proceeds to give a formylated compound of the Formula II in such a high yield as 80–90% based on the ethylene ketal of levulinic acid ester. Examples of the base are ones used in a conventional Claisen condensation, and they include sodium metal, sodium hydride or sodium ethoxide. The reaction is carried out in an organic solvent such as ether, benzene or toluene and at a temperature of 10°–50° C. preferably 15°–40° C. The reaction time is generally 6–40 hours.

The starting ethylene ketal of levulinic acid ester is a novel compound, which is produced by reacting a levulinic acid ester with ethyleneglycol in the presence of an acidic catalyst such as p-toluenesulfonic acid.

The formylation reaction is carried out, for example, according to the following manner.

To a solution prepared from 1 mole of the ethylene ketal of ethyl levulinate and 1.5–2 liters of organic solvent, 1.7 moles of base is suspended and the ester of formic acid is added thereto dropwise with stirring during 2–4 hours. About half of the formate has been added, the reaction starts and hydrogen gas evolution begins. After the addition of water to the reaction mixture and separation of the water layer, the formylated compound is extracted with organic solvent by acidifying the water layer with acetic acid. This extracted formyl derivative can be used to the next ring formation step without any further treatment.

STEP 2

Preparation of 5-methyl-3-furoic acid derivative of the Formula III from the formylated compound of the Formula II The formylated compound of the Formula II obtained in the Step 1 is subjected to furan ring formation by mixing and contacting it with an acid catalyst and stirring the mixture. The reaction is carried out in an inert solvent such as water.

Examples of the acid catalyst are ones used in a conventional furan-ring formation from γ-diketo type compound, and they include sulfuric acid, hydrochloric acid, phosphoric acid or oxalic acid. The amount of the acid catalyst is 5–20 times by weight, preferably 7.5 to 12 times by weight of the formylated compound of the Formula II.

The reaction temperature is, generally, 15°–30° C., preferably 20°–25° C.

The reaction time varies depending on the kind of the formyl derivative of the Formula II, the kind and the amount of the acidic catalyst or the reaction temperature and, generally it is 2–6 hours.

After the reaction is over, the product is separated from the reaction mixture by conventional method. For example, benzene is added into the reaction mixture to extract a produced oily substance and the benzene solution is washed with an aqueous sodium bicarbonate solution and an aqueous sodium chloride solution, dried and concentrated to dryness to obtain the objective 5-methyl-3-furoic acid derivative of the Formula III. Yield is 85–95% based on the formulated compound of the Formula II. The 5-methyl-3-furoic acid derivative of the Formula III thus obtained can be used for the next step without purification.

STEP 3

Halogenation of the 5-methyl-3-furoic acid derivative of the Formula III 2 moles of a halogen is added to 1 mole of a 5-methyl-3-furoic acid derivative of the Formula III obtained in the Step 2 in the presence or absence of an inert solvent under stirring. The halogen is used in a form of a gas, a liquid or a solution of an organic solvent. In case an inert solvent is used, examples of the solvent are ones inert to the halogen and they include tetrachloromethane, trichloromethane or dichloroethane. The amount of the inert solvent is 1–4 times by volume of the reactant. The reaction temperature is not especially restricted and generally —10° C. to 50° C. The halogenation proceeds almost as soon as the halogen is added to the reaction system. Therefore the reaction time is decided by the period of time of the addition of the halogen.

After the fixed amount of the halogen is added to the 5-methyl-3-furoic acid derivative of the Formula III, the reaction mixture is subjected to concentration to remove produced hydrogenhalide and a solvent, if any, from the reaction mixture and to yield the objective 2-halo-5-halomethyl-3-furoic acid derivative of the Formula IV. Yield is almost quantitative.

In this step, a catalyst or UV irradiation is not always necessary, and a conventional halogenation procedure may be used.

The 2-halo-5-halomethyl-3-furoic acid derivative thus obtained is, if necessary, purified by recrystallization.

It can be used as a raw material to the next step without purification.

If the halogenation is carried out by using N-bromosuccinimide as halogenation agent instead of a halogen, halogenated product becomes a mixture consisting of various halogenated compound. Examples of them have the formulae:

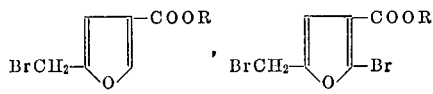

and

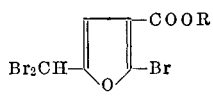

Further other unidentified by-products are formed by bromination.

Further, if the amount of halogen is 1 mole per 1 mole of the ethyl 5-methyl-3-furoate, the halogenated product is a mixture consisting of the compounds having the formulae

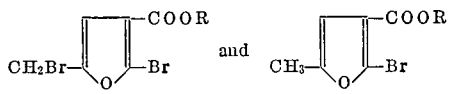

wherein R has the same meaning as defined above.

STEP 4

Preparation of 5-substituted 2-halo-3-furoic acid derivatives of the Formula V 5-substituted 2-halo-3-furoic acid derivative of the Formula V is produced by reacting 2-halo-5-halomethyl-3-furoic acid derivative obtained in the Step 3 with an aromatic hydrocarbon or a heterocyclic compound of the formula R'H, wherein R' has the same meaning as defined above, in the presence of a Friedel-Crafts catalyst such as aluminum chloride.

This reaction is not essentially different from an ordinary Friedel-Crafts reaction, and it is carried out, for example, by the following manner. That is, a 2-halo-5-halomethyl-3-furoic acid derivative of the Formula IV is mixed with an aromatic hydrocarbon or a heterocyclic compound of the formula R'H, and to the resultant mixture a Friedel-Crafts catalyst such as aluminum chloride is added gradually at a temperature of a room temperature or lower than it under stirring. Use of any solvent is not always necessary, but the aromatic hydrocarbon or the heterocyclic compound used as the starting material may be employed as the solvent, alternatively carbon disulfide, paraffinic hydrocarbons, or nitrobenzene can be used as the solvent.

1.2–1.5 moles of aluminum chloride is necessary to 1 mole of 2-halo-5-halomethyl-3-furoic acid derivative.

After the reaction have subsided, the reaction mixture is poured into 17% ice cold hydrochloric acid with stirring. The organic layer separated is taken and washed with aqueous sodium bi-carbonate solution then aqueous sodium chloride solution and the solvent is evaporated to dryness to give the 5-substituted 2-halo-3-furoic acid derivative.

The yield of the 5-substituted 2-halo-3-furoic acid derivative of the Formula V is 70–97% based on the 2-halo-5-halomethyl-3-furoic acid derivative of the Formula IV.

The thus obtained 5-substituted 2-halo-3-furoic acid derivative can be used as a starting material in the following Step 5 without isolation.

STEP 5

Preparation of the final 5-substituted 3-furoic acid derivatives of the Formula VI.

A 5-substituted 2-halo-3-furoic acid derivative of the Formula V obtained in the Step 4 is subjected to hydrolysis and dehalogenation reaction to yield the final 5-substituted 3-furoic acid derivative of the Formula VI.

The hydrolysis and dehydrogenation of a 5-substituted 2-halo-3-furoic acid derivative (V) is carried out by reacting it with water and zinc-powder under an alkaline condition.

A 5-substituted 2-halo-3-furoic acid derivative (V) is subjected to a reaction with water and zinc-powder under an alkaline condition, as a result, both hydrolysis and dehalogenation of the 5-substituted 2-halo-3-furoic acid derivative (V) occur at the same time to yield the objective 5-substituted 3-furoic acid. However it is preferable to carry out the hydrolysis of a 5-substituted 2-halo-3-furoic acid derivative according to a conventional manner such as reacting it with an aqueous alkali solution prior to the dehalogenation.

The dehalogenation is carried out by such an ordinary procedure as those in J.A.C.S., 55, 2903 (1933). Preferably the dehalogenation is effected by reacting with the 5-substituted 2-halo-3-furoic acid derivative of the Formula V with zinc-powders into the 5-substituted 2-halo-3-furoic acid derivative under such alkaline condition as in an ammonia or sodium hydroxide aqueous solution.

In case the dehalogenation is carried out by using ammonia or sodium hydroxide and zinc-powder in an aqueous solution, after the reaction is over, the reaction mixture is filtered to remove insoluble substance and the filtrate is washed with an organic solvent, acidified to produce an oily substance. The oily substance is extracted by a suitable organic solvent, and the organic solvent is distilled off to yield the objective 5-substituted 3-furoic acid derivative. The yield of this step is 90–95%.

As clear from the descriptions mentioned above, in the process of the present invention, no formation of by-products occurs in the course of the process and the objective 3-furoic acid derivative is produced in high yield and without any special procedure such as high vacuum distillation for purification at every intermediate step. Further in the process of the present invention, any compound difficult to be handled or obtained is not used.

These are advantages of the process of the present invention.

The present invention is illustrated more particularly by the following example. But it is not necessary that the present invention is not limited to it.

EXAMPLE.—PREPARATION OF 5-BENZYL-3-FUROIC ACID

Step 1

Preparation of ethylene ketal of ethyl α-formyl levulinate.—To a suspension of 64 g. of (1.5 mol.) of 56% sodium hydride-paraffin suspension and 500 ml. of dried diethyl ether was added dropwise a solution of 188 g. (1 mol.) of ethylene ketal of ethyl levulinate, 108 g. (1.5 mol.) of ethyl formate and 500 ml. of dried diethyl ether at 20–25° C. with stirring. When the viscosity of the reaction mixture increased together with generation of hydrogen during the addition of the solution, ether was added dropwise to the reaction mixture. After the completion of the addition, the stirring was continued for 1 day at a room temperature. The reaction mixture was poured into water (1 liter). The resultant aqueous layer was separated from the organic layer by extraction and acidified by acetic acid. The resultant organic substance was extracted by benzene, and benzene was distilled off to give 153 g. (yield: 71%) of a formyl derivative of the formula.

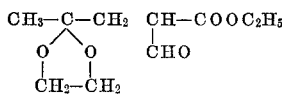

$n_D^{29}$ 1.4553. From the ether solution, 28 g. (15%) of ethylene ketal of ethyl levulinate was recovered.

Step 2

Preparation of ethyl 5-methyl-3-furoate.—153 g. of the crude formylated compound obtained in the Step 1 was added to 1.5 l. of concentrated hydrochloric acid. The mixture was stirred at a room temperature for 3 hours. The resultant oily substance was extracted by benzene. The benzene solution was washed by an aqueous sodium bicarbonate-saturated solution and an aqueous sodium chloride-saturated solution, dried over anhydrous sodium sulfate and then concentrated under reduced pressure to give 103 g. (yield: 92%) of ethyl 5-methyl-3-furoate, B.P. 86°–88° C./17 mm. Hg.

Step 3

Preparation of ethyl 2-bromo-5-bromomethyl-3-furoate.—To a solution of 20 g. of ethyl 5-methyl-3-furoate obtained in the Step 2 and 60 ml. of chloroform was added dropwise 22 g. of bromine at 2°–4° C. Reaction occurred at the same time of the addition and the reaction mixture colored deep green. After the addition, additional 22 g. of bromine was dropped under ultraviolet ray at 40° C. After 10–20 minutes, the reaction is over to give a pink colored reaction mixture. The reaction mixture was subjected to reduced distillation to remove chloroform from the reaction mixture. As a result 37 g. (yield: 92%) of ethyl 2-bromo-5-bromomethyl-3-furoate was obtained, M.P. 47–49° C.

*Elementary analysis.*—Calculated (percent): C, 30.80; H, 2.58; Br, 51.23. Found (percent): C, 30.44; H, 2.72; Br, 52.36.

Step 4

Preparation of 2-bromo-5-benzyl-3-furoic acid.—A solution of 31.6 g. of ethyl 2-bromo-5-bromomethyl-3-furoate obtained in the Step 3 and 100 ml. of benzene was maintained at 5°–10° C. and thereto added 19 g. of aluminum chloride little by little with stirring for 1 hour and the stirring was continued for 0.5 hour at 5°–10° C. Thereafter 150 ml. of ice cold hydrochloric acid was added to decompose a produced complex and then sodium chloride was added until the aqueous layer of the reaction mixture was saturated by sodium chloride. The resultant benzene layer was separated and washed with an aqueous sodium bicarbonate-saturated solution and an aqueous sodium chloride-saturated solution, and then dried over anhydrous sodium sulfate. The benzene solution was subject to reduced distillation to remove benzene and to yield 29.6 g. of pink oily substance (yield: 95%).

Step 5

Preparation of 5-benzyl-3-furoic acid.—The oily substance obtained in the Step 4 was saponified in methanol by using potassium hydroxide to obtain monohydrate of potassium 2-bromo-5-benzyl-3-furoate.

*Elementary analysis.*—Calculated (percent): C, 42.74; H, 2.99; Br, 23.70. Found (percent): C, 43.59; H, 2.82; Br, 24.54.

2-bromo-5-benzyl-3-furoic acid was obtained by acidifying a solution of thus obtained mono-hydrate of potassium 2-bromo-5-benzyl-3-furoate in a quantitative yield.

To a solution of 14.1 g. of 2-bromo-5-benzyl-3-furoic acid thus obtained and 70 ml. of 28% aqueous ammonia solution was added 5 g. of zinc-powder at 40° C. with stirring. After 15 minutes from the addition, an insoluble substance was filtered off and the filtrate was washed with benzene and acidified by acetic acid and the resultant product was extracted with benzene twice. The benzene layers were combined and washed with an aqueous sodium chloride-saturated solution, dried over anhydrous sodium sulfate and subjected to concentration under reduced pressure to yield 9.3 g. (yield: 92%) of 5-benzyl-3-furoic acid, M.P. 127.5°–129.5° C.

The thus obtained 5-benzyl-3-furoic acid was identified by N.M.R. spectrum and I.R. spectrum, and elementary analysis thereof showed that it did not contain any bromine.

What we claim is:

1. A process for producing 5-substituted 3-furoic acid derivatives of the formula

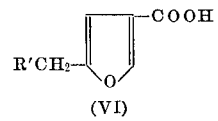

(VI)

wherein R' is phenyl, tolyl, xylyl, naphthyl, furyl, or thienyl which comprises reacting 2-halo-5-halomethyl-3-furoic acid derivative of the formula

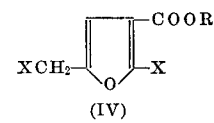

(IV)

wherein R is a lower alkyl and X is chlorine or bromine, with an aromatic hydrocarbon or a heterocyclic compound of the formula

wherein R' has the same meaning as defined above, in the presence of a Friedel-Crafts type catalyst to form a 5-substituted 2-halo-3-furoic acid derivative of the formula

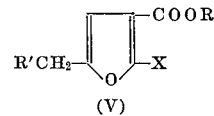

(V)

wherein R, R' and X have the same meanings as defined above, and hydrolyzing and dehalogenating by reacting the resultant 5-substituted 2-halo-3-furoic acid derivative of the Formula V with water and zinc-powder under an alkaline condition to yield the 5-substituted 3-furoic acid derivative of the Formula VI.

2. A process for producing 5-substituted 3-furoic acid derivative of the formula

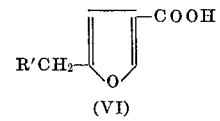

(VI)

wherein R' is phenyl, tolyl, xylyl, naphthyl, furyl or thienyl, which comprises reacting a 5-methyl-3-fuoric acid derivative of the formula

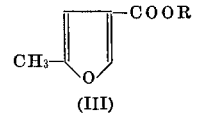

(III)

wherein R is a lower alkyl, with chlorine or bromine to yield a 2-halo-5-halomethyl-3-furoic acid derivative of the formula

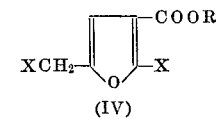

(IV)

wherein R has the same meaning as defined above and X is chlorine or bromine, reacting the resultant 2-halo-5-halomethyl-3-furoic acid derivative of the Formula IV, with an aromatic hydrocarbon or a heterocyclic compound of the formula

R'H wherein R' has the same meaning as defined above, in the presence of a Friedel-Crafts type catalyst to form a 5-substituted 2-halo-3-furoic acid derivative of the formula

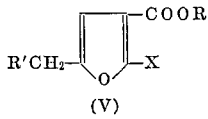

(V)

wherein R, R' and X have the same meaning as defined above, and hydrolyzing and dehalogenating the result 5-substituted 2-halo-3-furoic acid derivative of the Formula V by reacting it with water and zinc-powder under an alkaline condition to yield the 5-substituted 3-furoic acid derivative of the Formula VI.

3. A process for producing 5-substituted 3-furoic acid derivatives of the formula

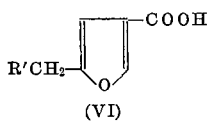

(VI)

wherein R' is phenyl, tolyl, xylyl, naphthyl, furyl or thienyl which comprises contacting a formylated compound of the formula

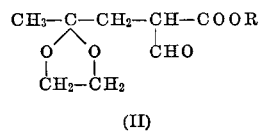

(II)

wherein R is a lower alkyl, with an acidic catalyst to yield a 5-methyl-3-furoic acid derivative of the formula

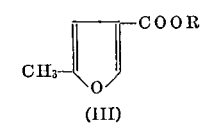

(III)

wherein R has the same meaning as defined above, reacting the resultant 5-methyl-3-furoic acid derivative of the Formula III with chlorine or bromine to yield a 2-halo-5-halomethyl-3-furoic acid derivative of the formula

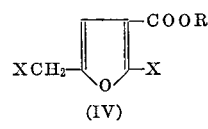

(IV)

wherein R has the same meaning as defined above and X is chlorine or bromine, reacting the resultant 2-halo-5-halomethyl-3-furoic acid derivative of the Formula IV with an aromatic hydrocarbon or a heterocyclic compound of the formula

R'H wherein R' has the same meaning as defined above, in the presence of a Friedel-Crafts type catalyst to form a 5-substituted 2-halo-3-furoic acid derivative of the formula

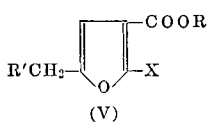

(V)

wherein R, R' and X have the same meanings as defined above, and hydrolyzing and dehalogenating the resultant 5-substituted 2-halo-3-furoic acid derivative of the Formula V by reacting it with water and zinc-powder under an alkaline condition to yield the 5-substituted 3-furoic acid derivative of the Formula VI.

4. A process for producing 5-substituted 3-furoic acid derivatives of the formula

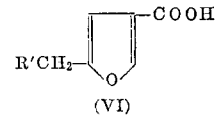

(VI)

wherein R' is phenyl, tolyl, xylyl, naphthyl, furyl or thienyl which comprises reacting an ethylene ketal of levulinic acid ester of the formula

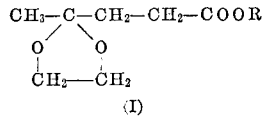

(I)

wherein R is a lower alkyl, with an alkyl formate in the presence of a base to yield a formylated compound of the formula

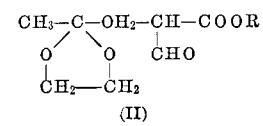

(II)

wherein R has the same meaning as defined above, contacting the resultant formylated compound of the Formula II with an acidic catalyst to yield a 5-methyl-3-furoic acid derivative of the formula

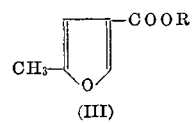

(III)

wherein R has the same meaning as defined above, reacting the resultant 5-methyl-3-furoic acid derivative of the Formula III with chlorine or bromine to yield a 2-halo-5-halomethyl-3-furoic acid derivative of the formula

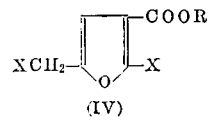

(IV)

wherein R has the same meaning as defined above and X is chlorine or bromine reacting the resultant 2-halo-5-halomethyl-3-furoic acid derivative of the Formula IV with an aromatic hydrocarbon or a heterocyclic compound of the formula

R'H wherein R' has the same meaning as defined above, in the presence of a Friedel-Crafts type catalyst to form a 5-substituted 2-halo-3-furoic acid derivative of the formula

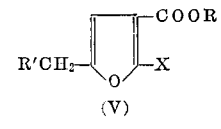

(V)

wherein R, R' and X have the same meanings as defined above, and hydrolyzing and dehalogenating the resultant 5-substituted 2-halo-3-furoic acid derivative of the Formula V by reacting with water and zinc-powder under an alkaline condition to yield the 5-substituted 3-furoic acid derivative of the Formula VI.

5. A process according to claim 1, wherein the aromatic hydrocarbon residue of R' is phenyl, the lower alkyl of R is ethyl and the halogen atom of X is bromine.

6. A process according to claim 2, wherein the aromatic hydrocarbon residue of R' is phenyl, the lower alkyl of R is ethyl and the halogen atom of X is bromine.

7. A process according to claim 3, wherein the aromatic hydrocarbon residue of R' is phenyl, the lower alkyl of R is ethyl and the halogen atom of X is bromine.

8. A process according to claim 4, wherein the aromatic hydrocarbon residue of R' is phenyl, the alkyl formate is ethyl formate, the lower alkyl of R is ethyl and the halogen atom of X is bromine.

9. A compound of the formula

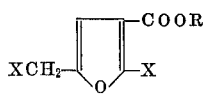

wherein R is a lower alkyl and X is chlorine or bromine.

10. A compound of the formula

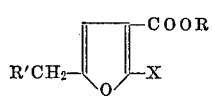

wherein R is a lower alkyl, R' is phenyl, tolyl, xylyl, naphthyl, furyl or thienyl and X is chlorine or bromine.

References Cited

UNITED STATES PATENTS

| | | | |
|---|---|---|---|
| 3,465,007 | 9/1969 | Elliot | 260—347.4 |
| 3,466,304 | 9/1969 | Elliot et al. | 260—347.8 |

OTHER REFERENCES

Dunlop and Peters, The Furans, Reinhold Pub. Co. (1953), pp. 131–3.

ALEX MAZEL, Primary Examiner

B. I. DENTZ, Assistant Examiner

U.S. Cl. X.R.

260—332.2, 340.9, 347.5